United States Patent Office 2,978,299
Patented Apr. 4, 1961

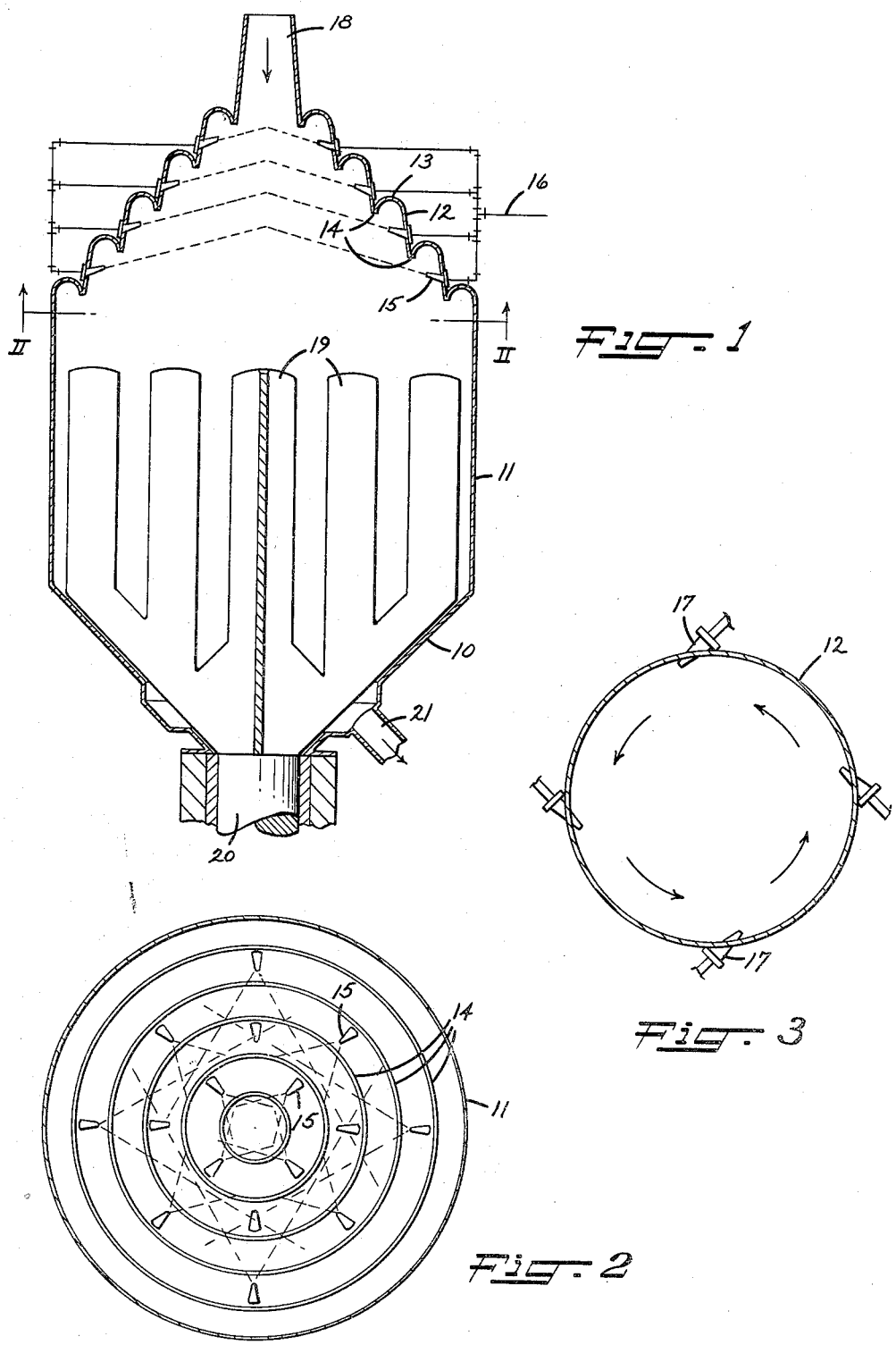

2,978,299
DISSOLVING AND MIXING APPARATUS
David T. Milne, Fredericksburg, Va., assignor to American Viscose Corporation, Philadelphia, Pa., a corporation of Delaware Filed July 8, 1958, Ser. No. 747,291
1 Claim. (Cl. 23—267)

This invention relates to apparatus for facilitating the formation of viscous solutions or dispersions wherein bulky solids are added to a liquid or wherein a liquid is added to the solids. In its more particular aspects the invention relates to an apparatus for prewetting the bulky solids with a portion of the solvent before finally bringing together the full amount of solids and liquid.

When bulky solids are dissolved in liquids batchwise to form viscous solutions, great difficulties have been encountered in completely dissolving the solids, both when the entire amount of solid material is dumped into the entire amount of liquid and when the complete amount of liquid is added at one time to the batch of solids.

When the bulky solid is added with mixing to the full amount of solvent or liquid, the first quarter or third of the solid dissolves quickly and readily, but, as the solution or liquid becomes more and more viscous, the tendency of the solid to float on the surface of the liquid and also the tendency of the liquid to surround lumps and balls of the solid with thick gelatinous material, which prevents penetration by the liquid, become more and more pronounced. As a result, the last third or fourth of the solid which is added requires much more time and much more dastic mixing to effect complete solution than the portion added initially. In this case, when slow speed mixers are used, the time requirements are very high and undissolved lumps may persist in the solution for a long time after 99% of the solid, for example, is completely dissolved or dispersed. A similar situation exists when high speed mixers are used. As soon as the liquid becomes viscous, mixing is localized. The tendency to beat air into the solution increases. The portion of the mass not being mixed and the number of "dead spots" also increase. Examples of the above are the mixing of cellulose xanthate crumbs or of cellulose ether reaction mass crumbs with dilute caustic soda solution to form viscose or cellulose ether solutions, the mixing of cellulose nitrate or acetate with organic solvents to form lacquer bases, spinning dopes and the like.

When the liquid is added to the full amount of the bulky solids, the liquid channels to the bottom of the vessel, the solids float and lumps are formed with the attendant difficulties mentioned above.

It is known that the above difficulties can be overcome to a great extent by thoroughly wetting the solids with a small amount of the liquid before the solids are added to the complete volume of liquid in which they are to be dissolved and it is accordingly the primary object of the present invention to provide apparatus for facilitating the prewetting of the bulky solids.

It is another object of the invention to provide means for incorporating bulky solids continuously with liquids to form viscous solutions in such a manner that the solids cannot float on the surface of the liquid and/or so that lumps or balls of solid surrounded by viscous material cannot be formed.

Other and further objects, features, and advantages of the invention will become apparent as the description of certain preferred embodiments thereof proceeds.

Referring now to the drawing:
Figure 1 is a vertical sectional view of the apparatus,
Figure 2 is a sectional view taken along the line II—II of Figure 1, and
Figure 3 is a sectional view showing a modification of the upper portion of the apparatus.

The apparatus comprises a tower or vertically extending vessel having a frusto-conical bottom portion 10, a cylindrical portion 11 extending upwardly from the frusto-conical bottom and an uppermost section consisting of a plurality of upwardly and inwardly stepped concentric annular surfaces 12. The inwardly stepped surfaces 12 are joined to one another by upwardly curving semi-cylindrical portions 13 so as to form within the vessel a plurality of annular downwardly directed edges 14, the purpose of which will be referred to hereinafter. A plurality of fluid discharge means in the form of nozzles 15, which may be either spray nozzles or atomizing nozzles, are mounted in each of the annular surfaces 12 and these nozzles are supplied with a solvent liquid through a suitable system of conduits indicated diagrammatically at 16. According to that form of the invention shown in Figures 1 and 2, the nozzles 15 operate at low pressure and are directed inwardly toward the vertical axis of the vessel and also at a slight upward angle to fill the upper portion of the vessel with a mist or fine spray of solvent liquid. In that form of the invention shown in Figure 3 the nozzles are designated at 17 and said nozzles operate at high pressure and are directed to discharge the liquid circumferentially of the vessel. In this latter form of the invention, the nozzles of each alternate annular surface 12 are directed in opposite directions so as to create a plurality of oppositely swirling layers of solvent in the upper portion of the vessel.

The vessel has an opening 18 at the top which is concentric to the vertical center line of said vessel through which the bulky solids are introduced. The opening 18 is of substantially smaller area than the main cylindrical body portion 11 of the vessel and as the solids drop through the upper stepped portion of the vessel they pass through either the fine mist produced in the arrangement of Figures 1 and 2 or through the alternating layers of oppositely swirling liquid in that form of the apparatus shown in Figure 3 before dropping into the lower portion of the vessel. With that form of apparatus shown in Figure 3, the solid material need not be as finely divided as when using the apparatus of Figures 1 and 2 because the alternately swirling layers of liquid under high pressure buffet the larger pieces against one another and against the steps 12 to not only wet the solids but to mechanically break them up.

The edges 14 of the annular surfaces 12 serve to cause any of the liquid which is not absorbed by the solids or which does not adhere to the surface thereof to drip into the interior of the cylindrical portion 11 rather than run down the side of the vessel. The filling of the upper portion of the vessel with a spray not only serves to thoroughly and uniformly wet the solids but also prevents air from getting into the lower portion of the vessel through the open top 18.

Agitating means in the form of a beater having a plurality of upwardly directed fingers 19 is mounted in the lower portion of the vessel and is continuously rotated or oscillated by a shaft 20 extending upwardly through the bottom of the vessel. After passing through the upper portion of the vessel the then thoroughly wetted solids drop into the cylindrical portion 11 wherein they are further broken up and mixed with the additional liquid which drips from the ridges 14 to form a uniform viscous solution which may be continuously withdrawn by means of a suitable pump, not shown, through a conduit 21 opening into the frusto-conical bottom portion 10.

Having thus described the invention, what is claimed is:

Apparatus for incorporating bulky solids continuously with liquids to form viscous solutions comprising a vertically extending vessel, said vessel having a frusto-conical bottom, a cylindrical portion extending upwardly from said bottom, an upper portion above said cylindrical portion comprising a plurality of upwardly and inwardly stepped concentric annular surfaces, said surfaces having upwardly curved portions and being joined together in such manner as to form downwardly directed edges between adjacent surfaces, low pressure nozzles mounted on said annular surfaces and aimed toward the vertical axis of said vessel for filling the upper portion thereof with a mist of solvent liquid, means for supplying a solvent liquid to said nozzles, said downwardly directed edges causing said solvent to drip into the interior of the cylindrical portion of said vessel, means for admitting bulky solids into the upper portion of said vessel along the vertical axis of said vessel whereby said solids fall through the mist-filled upper portion of said vessel before dropping into the cylindrical portion thereof, agitating means in the cylindrical portion of said vessel, and means for continuously withdrawing viscous solution from the frusto-conical bottom of said vessel.

References Cited in the file of this patent

UNITED STATES PATENTS

| | | |
|---|---|---|
| 1,790,347 | Hawkins | Jan. 27, 1931 |
| 1,874,209 | Schnabel | Aug. 30, 1932 |
| 2,136,158 | Thomas | Nov. 8, 1938 |
| 2,528,514 | Harvey et al. | Nov. 7, 1950 |
| 2,684,231 | Pomykala | July 20, 1954 |
| 2,746,735 | Bradford | May 22, 1956 |

FOREIGN PATENTS

| | | |
|---|---|---|
| 791,554 | Great Britain | Mar. 5, 1958 |